Figure 1:
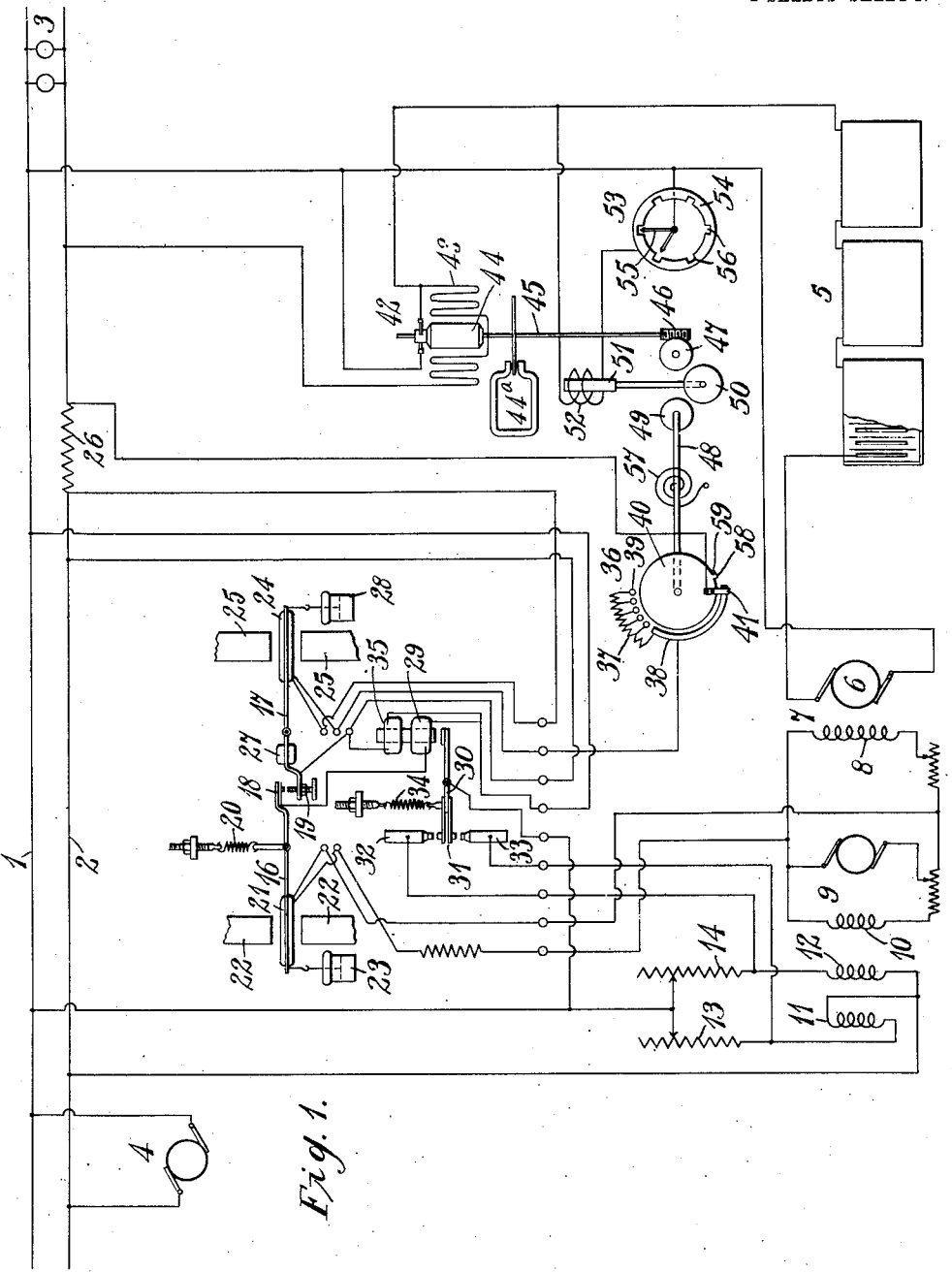

F. CONRAD.
SYSTEM OF DISTRIBUTION.
APPLICATION FILED JUNE 6, 1911.

1,108,886.

Patented Sept. 1, 1914.

2 SHEETS—SHEET 1.

WITNESSES:
Fred H. Miller
D. H. Wace

INVENTOR
Frank Conrad
BY
Wiley G. Carr
ATTORNEY

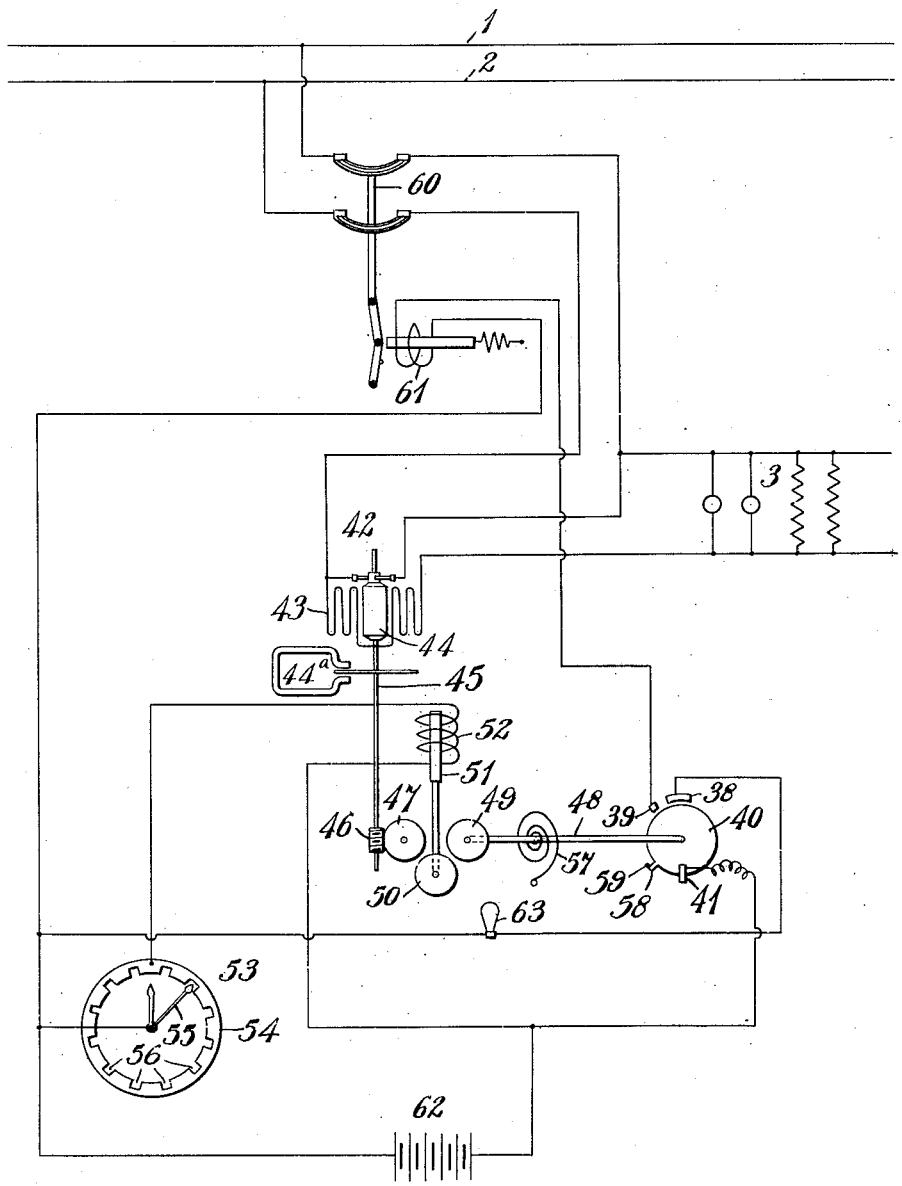

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,108,886.  Specification of Letters Patent.  Patented Sept. 1, 1914.

Application filed June 6, 1911. Serial No. 631,608.

*To all whom it may concern:*

Be it known that I, FRANK CONRAD, a citizen of the United States, and a resident of Pittsburgh, in the county of Allegheny and State of Pennsylvania, have invented a new and useful Improvement in Systems of Distribution, of which the following is a specification.

My invention relates to systems of distribution, and it has for its object to provide a practical system of this class which shall be simple in arrangement and shall embody adequate means for automatically limiting or restricting the energy delivered to a receiving circuit or to a translating device to a prescribed ultimate value within a predetermined period of time.

It has been a common practice in the prior art to employ a storage battery in combination with a main source of energy for the purpose of supplying variable amounts of current to a receiving circuit, the main source of energy being of sufficient capacity to supply the average required load while the storage battery need only assist the main source of energy by carrying the temporary fluctuations and peak loads.

In another application, Serial No. 325,291, filed by me July 9, 1906, I have set forth a regulator for a storage battery whereby the load carried by the main source of energy and the voltage applied to the receiving circuit by the storage battery may be maintained substantially constant, irrespective of whether the battery is fully or only partially charged. Such a regulator is employed for the purpose of causing the battery to carry the peaks and temporary excesses of load and to be charged when the load upon the circuit is less than a predetermined amount. A further purpose of such a regulator is to supplement the voltage of the battery, which varies with its degree of charge, by a variable booster voltage, such that the voltage upon the circuit may be maintained substantially constant. In the use of this regulator, it is necessary to periodically observe the specific gravity of the electrolyte of the battery, in order to determine its condition as regards charge and to manually adjust the regulator so that the main source of energy will carry an increased proportion of the total load upon the circuit when the battery is low in charge, that is, when the specific gravity of its electrolyte is low.

It is a well known fact that, if a storage battery be discharged below a predetermined amount or faster than a predetermined rate, its life and efficient operation are seriously affected and the cost of maintenance and attendance is materially increased.

With the end in view of protecting the storage battery from injurious abuse of the above-mentioned character, I have devised suitable means for automatically adjusting the regulator to effect increases of load on the main source of energy when the battery is discharged at a predetermined excessive rate, that is, when the energy supplied by the battery to the receiving circuit exceeds a predetermined amount within a definite time interval.

According to my present invention, I employ a regulating device, similar to that set forth in the application hereinbefore mentioned, which operates in substantially the same manner and for the same purpose. Furthermore, I provide an integrating wattmeter in the storage battery circuit which is adapted to integrate the power delivered thereby to the receiving circuit and, by means of a suitable clock mechanism, the wattmeter is periodically operatively associated with a rheostatic device which is connected in one of the regulator circuits in such manner that changes in the adjustment of the regulator may be effected in accordance with the amount of power supplied by the storage battery within a given time.

As a modification of the embodiment of my invention hereinbefore outlined, I contemplate the employment of the protecting means for the purpose of disconnecting a receiving circuit or translating device from the source of energy when the total amount of power consumed thereby exceeds a prescribed ultimate value within a given interval of time. It is customary for power and lighting companies to base their charges, not only upon the average demand required by the customer, but also upon a so-called "peak" or "maximum demand" basis. Heretofore, various devices have been employed for the purpose of registering and recording these "maximum demands" for a predetermined short interval of time in each hour, and the rate is generally determined upon an average of these recorded "maximum demand" figures. In some cases, however, power is sold with the stipulation that if any recorded "peak demand" exceeds a prescribed ultimate value, a higher and permanent average "peak" rate will be established. It is evident, therefore, that it is of the utmost importance for the customer to keep his "peak demand" within the prescribed ultimate limit, and for this purpose, I intend the modified embodiment of my invention, which is arranged to give a suitable warning when the power consumption for a predetermined interval of time is dangerously near the ultimate limit and to automatically disconnect the receiving circuit or translating device from the source of energy when the prescribed limit is reached. In this modification, the protecting means is connected and operated in the same manner that it would be if employed in connection with a storage battery and its associated regulator, except that, in lieu of the rheostatic device, which adjusts the regulator to reduce the load upon the battery, a switching device is employed which is adapted to operate a warning signal and subsequently to cause the trip coil of the main circuit interrupter to be energized, whereby the entire load upon the source of energy is thrown off.

My invention may best be understood by reference to the accompanying drawings, in which—

Figure 1 is a diagrammatic view of a system of distribution which embodies my invention and Fig. 2 is a diagrammatic view of a modification thereof.

Referring to Fig. 1, an electrical circuit 1—2, to which a variable load, represented by translating devices 3, is connected, is supplied with energy from a main generator 4 and a storage battery 5, the latter being connected to the circuit in series with armature 6 of a booster generator 7.

Field magnet winding 8 of the booster generator is supplied from an exciter 9 having a main shunt field magnet winding 10 and two auxiliary field magnet windings 11 and 12 that are arranged to oppose each other, and are connected in parallel across the circuit 1—2 and respectively in series with resistances 13 and 14, though they may, of course, be connected to any suitable circuit of substantially constant potential.

The resistances 13 and 14 are adapted to be alternately shunted by means of a regulating device to be hereinafter described, the effect of such shunting being to cause the one or the other of the auxiliary field magnet windings 11 and 12 of the exciter 9 to predominate in its magnetizing effect.

The ampere turns of the auxiliary field magnet windings 11 and 12 are such that the polarity of the exciter is dependent upon which of the windings predominates in its magnetizing effect. For example, if the resistance 13 is shunted, field magnet winding 11 predominates in its magnetizing effect and the voltage of the exciter 9 will be in such a direction that the voltage of the booster 7 will supplement that of the battery 5; whereas, if the resistance 14 is shunted the effect of the winding 12 predominates and the voltage of the booster opposes that of the battery.

The regulating means is substantially like that set forth in my application, Serial No. 325,291, hereinbefore mentioned, and in my application Serial No. 483,660, filed March 15, 1909, and comprises a main relay device consisting of two pivotally mounted arms 16 and 17 the free ends of which carry coöperating contact terminals 18 and 19. The arm 16 is maintained in a substantially horizontal position, by means of a spring 20, and is adapted to be rotatively moved about its pivotal support by means of an electromagnetic actuating device consisting of a coil 21, that is connected between the terminals of the exciter 9, and permanent magnets 22, between which the coil 21 is movably disposed. It will be understood that the direction of movement of the coil 21 will depend upon the direction of the flow of current in the booster field circuit. The circuit connections are so arranged that, when the direction of current flow in the booster field circuit is such that the booster voltage supplements that of the battery, coil 21 moves upwardly and the contact terminal 18 approaches the contact terminal 19, and when the direction of current flow in the booster field circuit is such that the booster voltage opposes that of the battery, the coil 21 moves downwardly and the terminal 18 recedes from the terminal 19. Movements of the arm 16 may be retarded by means of a dash pot 23, or other suitable means.

The other arm 17 of the relay device is actuated to vary the position of contact terminal 19 by means of a movable coil 24 that is disposed between the poles of permanent magnets 25 and is connected in shunt to a resistance 26 in the circuit conductor 2, so that it is traversed by a current which is proportional to the current supplied to the translating devices 3 by the generator 4. The weight of the coil 24 is partially counterbalanced by an adjustable counterweight 27, and the direction of current flow in the coil 24 is such as to tend to rotate the arm 17 in a counter clockwise direction in opposition to the effect of gravity. The movements of the arm 17 may also be retarded by a suitable means, such as a dash pot 28.

The contact terminals 18 and 19 govern the circuit of a magnet winding 29 of an auxiliary relay device, that, in turn, governs shunt circuits to the resistances 13 and 14. The relay device comprises, further, a pivotally mounted arm 30 carrying flexibly supported contact terminals 31 that operate between, and are adapted to alternately engage, stationary contact terminals 32 and 33. The contact terminals 32 and 33 are connected respectively to the terminals of the resistances 13 and 14 and the arm 30 is connected to the common terminal of said resistances. One of the contact members 31 is normally maintained in engagement with the contact terminal 32 by means of a spring 34, the tension of which may be regulated. The other contact terminal 31 is adapted to be moved downwardly into engagement with the contact terminal 33, by means of an electromagnet having two windings, one of which is the winding 29 and the other is winding 35, the latter winding being permanently connected between the circuit conductors 1—2.

Under normal operating conditions, the effect of the winding 35 is to maintain the terminals 31 and 33 in engagement, except when the winding 29 is energized by reason of the engagement of terminals 18 and 19, when the effects of the windings 35 and 29 neutralize each other. The spring 34 is then permitted to effect the engagement of contact terminals 31 and 32.

The amount of current that traverses the circuit in shunt to the resistance 26 and which includes the coil 24, is regulated automatically by means of a rheostatic device 36, which comprises a sub-divided resistance 37, a stationary contact segment 38 and a plurality of stationary contact terminals 39 to which said resistance is connected. The rheostatic device 36 further comprises a rotatable member 40 carrying a movable contact terminal 41 which normally is adapted to coöperatively engage the contact segment 38 and which engages the contact terminals 39, under predetermined conditions.

An integrating wattmeter 42, of well-known construction, is connected, in the usual manner, to the circuit which supplies energy from the battery 5 to the translating devices 3, said wattmeter embodying series coils 43, armature 44, damping device 44ª and a main shaft 45 that rotates at variable speeds in accordance with well-known principles.

The meter shaft 45 is provided with a worm 46 and a coöperating worm-wheel 47, by means of which the rotational movement of the shaft may be imparted to an auxiliary shaft 48, through the agency of a gear wheel 49, which is fixed to the shaft 48 and an idler gear wheel 50, the latter being adapted to be periodically brought into engagement with the gear wheels 47 and 49, as will be hereinafter set forth.

The idler gear wheel 50 is suitably suspended from a movable core member 51 of an electromagnet 52 which is adapted to be energized periodically from the battery 5 through a switching device or clock-mechanism 53.

The switching device 53 comprises an anular contact member 54 of conducting material and a coöperating rotatable contact arm 55, the inner portion of the annular member 54 being provided with a plurality of equally spaced and comparatively narrow notches 56, and the contact arm 55 being rotated at uniform speed. By suitably spacing the notches 56, the duration of contact between the annular member 54 and the contact arm 55 may be predetermined.

As shown, the contact arm 55 constitutes the minute hand of a clock mechanism, but those skilled in the art will readily understand that an uniform rate of rotation may be imparted to the contact arm 55 by any other suitable means.

The auxiliary shaft 48 carries the rotatable member 40, upon which is located the movable contact member 41, and said shaft is biased to its initial position by means of a spiral spring 57 which is adapted to reset the rheostatic device 36 subsequent to the interruption of the circuit through the switching device 53 and the disengagement of the idler gear wheel 50. A projection 58 is provided on the rotatable member 40 to engage a suitable stop 59 and to restrict the counter clockwise rotation of the movable member 40 in its resetting operation.

In the normal operation of the system, the storage battery 5 may be subjected to intermittent periods of charge and discharge, and hence, it is evident that the integrating wattmeter 42 will be rotated in opposite directions, depending upon the action of the battery. However, it is the purpose of this invention to control only the discharges of the battery and, hence, it is necessary to provide such connection between the meter shaft 45 and the gear wheel 47 that the rotational movement of the wattmeter will be imparted to the movable contact member 41 through the agency of the gear wheels 47, 49 and 50 only when the wattmeter is operated in a given direction during periods of discharge. Such mechanical connections are well known to those skilled in the art, and it is not deemed necessary to show and describe the structure thereof, as any suitable means for accomplishing the desired purpose may be employed.

While the auxiliary shaft 48 is operatively associated with the shaft 45 of the wattmeter by means of the idler gear wheel 50, the rotatable member 40 and its associated movable contact member 41 are rotated from the meter shaft 45 at variable speeds in proportion to the amount of power delivered by the battery and passing through the wattmeter, as will be readily understood. By suitably designing or disposing the contact segments 38 and contact terminals 39 of the rheostatic device 36, the sections of the resistance 37 may be automatically inserted into the circuit which includes the movable coil 24 when any predetermined amount of power is delivered by the battery 5 to the translating devices 3 within the contact period or time interval for which the switching device 53 is designed or adjusted. When resistance is thus inserted in circuit with the coil 24, it is evident that an increased amount of current must traverse the resistance 26, in order to cause a sufficient amount of current to traverse the coil 24 to effect a disengagement of the contact terminals 18 and 19 or to cause the contact terminal 19 to be moved downwardly.

Since the current which traverses the resistance 26 is that which is supplied by the generator 4 to the receiving circuit or translating devices 3, the variations of the resistance 37, through the agency of the wattmeter 42, automatically effects adjustments of the load carried by the generator 4, whereby the amount of energy delivered to the receiving circuit by the storage battery 5 is reduced. Thus, predetermined injurious and excessive battery discharges are automatically prevented.

Inasmuch as the regulating device pertains to my invention only indirectly as it performs a necessary function in the operation of the system, and, inasmuch as its construction and mode of operation are set forth in detail in my application Serial No. 483,660, I do not consider it advisable to present any further discussion of the mode of operation.

In so far as the present application is concerned, it is sufficient to understand that the insertion of the resistance 37 into the circuit which includes the movable coil 24 automatically effects such adjustments in the regulating device that the load upon the main generator 4 is increased while the load supplied by the storage battery is correspondingly decreased.

Assuming the translating devices 3 to be operating under normal conditions, the regulating device to be performing its intended function of maintaining the load upon the generator 4 constant, and the various circuit connections and devices to occupy the positions shown, the operation of the system is as follows: It will be noted that the movable contact arm 55 of the clock mechanism 53 registers with one of the notches 56 in the annular contact member 54 and, hence, the electromagnet 52 is deënergized and the rotatable member 40, which carries the movable contact member 41, is disconnected from the shaft 45 of the wattmeter 42.

As the contact arm 55 passes over the notches 56, which requires an inappreciable amount of time in comparison with the duration of the contact interval, an engagement with the annular contact member 54 is effected, thereby establishing an energizing circuit through the electromagnet 52 and causing the idler gear wheel 50 to be brought into operative engagement with the gear wheels 47 and 49. Thus, the rotatable member 40 is operatively associated with the shaft 45 of the wattmeter and the movable contact member 41 may therefore be rotated in a clockwise direction in accordance with the amount of power delivered by the storage battery 5 to the translating devices 3, through the wattmeter 42. If the storage battery 5 is discharging and supplying energy to the translating devices 3, the movable contact member 41, which is associated with the rotatable member 40, is gradually rotated in a clockwise direction, in accordance with the amount of power passing through the wattmeter 42. If the total energy integrated by the wattmeter within the predetermined time interval be sufficient to cause the movable contact member 41 to engage the first contact terminal 39, the first section of the resistance 37 is automatically inserted into the circuit which includes the movable coil 24. Thus, as hereinbefore explained, the regulator is adjusted to cause the generator 4 to take a greater portion of the load while the storage battery 5 is partially relieved of its excessive discharge. In case more energy is delivered from the battery 5 within that particular time interval, the contact member 41 is caused to successively engage the remaining contact terminals 39, whereby additional sections of the resistance 37 are successively inserted into the regulator circuit and the total load upon the system is gradually thrown upon the generator 4, in order to prevent an excessive and injurious discharge of the battery 5, as will be readily understood. When the predetermined time interval has elapsed, the rotatable contact arm 55 of the switching device 53 registers with one of the notches 56 and the energizing circuit through the electromagnet 52 is interrupted, thereby allowing the idler gear wheel 50 to drop out of engagement with the gear wheels 47 and 49. The shaft 48 and its associated rotatable member 40 are then immediately returned to their initial position, by means of the spiral spring 57. In case the amount of power delivered within the predetermined time interval to the translating devices 3 by the storage battery 5 be insufficient to cause the movable contact member 41 to engage the first contact terminal 39 of the rheostatic device 36, the regulator continues its normal operation for its initial load adjustment and the movable member 41 is reset to its initial position without affecting the adjustment or operation of the regulator. This cycle of operation is periodically repeated in the manner hereinbefore set forth, and excessive and injurious rates of discharge of the battery 5 are thereby prevented.

Reference may now be had to Fig. 2, in which similar parts are designated by the same reference characters.

A supply circuit 1—2 is adapted to deliver energy through a circuit interrupter 60 and an integrating wattmeter 42 to a plurality of translating devices 3, an auxiliary shaft 48 and its associated rotatable member 40 being adapted to be periodically connected to the meter shaft 45, through the agency of suitable gear wheels 47, 49 and 50, and a clock mechanism or switching device 53 in a manner similar to that hereinbefore set forth in connection with the system shown in Fig. 1.

The circuit interrupter 60 may be of any well-known type of construction and is provided with an auxiliary trip coil 61 which is adapted to be energized under predetermined conditions by an auxiliary battery 62 or other suitable source of energy.

The construction and mode of operation of the integrating wattmeter 42, the switching device 53 and the mechanism by which the movable contact member 41 is rotated in accordance with the amount of power traversing the wattmeter 42, are similar to those hereinbefore set forth in detail and no further description of the same will be given.

The contact members 38 and 39 are adjustable in position and may be so located that engagement with the movable contact member 41 occurs when any predetermined amounts of power are consumed by the translating devices 3 within the contact period or time interval for which the switching device 53 is designed.

Assuming the translating devices 3 to be operating under normal conditions and the various parts of the apparatus to occupy the positions shown, the operation of the system is as follows: It will be noted that the contact arm 55 of the switching device 53 is not in engagement with the annular contact member 54, and, hence, the electromagnet 52 is deënergized and the rotatable member 40 is not operatively associated with the shaft of the wattmeter 42. However, as the contact arm 55 moves into engagement with the annular contact member 54, a circuit is completed through the energizing winding of the electromagnet 52 and the gear wheel 50 is raised into engagement with the gear wheels 47 and 49, thereby establishing an operative connection between the shaft 48 and the wattmeter 42. The movable contact member 41 is, therefore, rotated in a counter clock-wise direction, in accordance with the amount of power consumed by the translating devices 3 and integrated by the wattmeter 42. If the power consumption within the given time interval is sufficient to cause the engagement of the contact member 41 and the contact member 38, a circuit which includes the contact members 41 and 38 and the signal lamp 63, is established from the battery 62. Thus, energy is supplied to the lamp 63, which constitutes a warning signal to indicate that the total amount of integrated power is dangerously near the ultimate prescribed "peak demand" for which the apparatus is adjusted. If the consumption of power within the predetermined time interval is sufficient to cause engagement of the movable contact member 41 with the stationary contact terminal 39, a circuit, which includes the contact members 41 and 39 and the trip coil 61 of the circuit interrupter 60, is established from the battery 62. Energy is thus supplied to the trip coil 61 which trips open the circuit interrupter 60, according to well-known practice and thereby discontinues the power consumption and prevents an excessive ultimate "peak demand." If the contact period or predetermined time interval elapses before the movable contact member 41 comes into engagement with the contact terminal 39, an interruption of the circuit through the winding of the electromagnet 52 is effected by means of the switching device 53 and the idler gear wheel 50 is dropped out of engagement with the gear wheels 47 and 49. The spiral spring 57 then returns the rotatable member 40 and its associated contact member 41 to the initial position. This cycle of operation continues periodically in the manner hereinbefore set forth until an excessive amount of power is consumed and the translating devices are automatically disconnected from the source of energy, as hereinbefore described.

Although I have set forth my invention as embodying systems of distribution having specific circuit connections and arrangement and location of parts, it is evident that various modifications may be effected therein without departing from the spirit and scope of my invention, and I desire that only such limitations shall be imposed as are indicated in the appended claims.

I claim as my invention:

1. The combination with an electric circuit and an integrating wattmeter, of a movable member, means for periodically associating said movable member with said wattmeter, and means dependent upon the movement of said movable member for effecting changes in said electric circuit.

2. The combination with an electric circuit and an integrating wattmeter, of a movable member biased to its initial position, means for operatively associating said movable member with said wattmeter, and means associated with said movable member and dependent upon the degree of movement thereof for effecting changes in said electric circuit.

3. The combination with a shaft that rotates at variable speeds and a movable member biased to its initial position and adapted to be periodically associated with said shaft, of a circuit, and a circuit-controlling device associated with said movable member and adapted to effect changes in said circuit when said member is moved a predetermined amount.

4. The combination with a shaft that rotates at variable speeds, a rotatively movable member biased to its initial position and adapted to be periodically associated with said shaft for given intervals of time, of a circuit, and a circuit-controlling device associated with said rotatively movable member and adapted to effect changes in said circuit when said member is moved a predetermined amount.

5. The combination with an integrating wattmeter, a rotatively movable member biased to its initial position and adapted to be moved in proportion to the amount of energy periodically passing through said wattmeter, and electromagnetic means for periodically associating said movable member with said wattmeter, of an electric circuit, and means associated with said movable member and dependent upon a predetermined amount of movement thereof for effecting changes in said circuit.

6. The combination with an electric circuit, a circuit-controlling means, and a wattmeter device connected to said circuit, of means for operating said circuit-controlling means when the power consumed during a predetermined interval of time exceeds a predetermined amount.

7. The combination with an electrical circuit, a wattmeter device connected thereto, and a circuit-controlling device, of means for causing said circuit controlling device to effect changes in said circuit when the electrical energy supplied to said wattmeter device during a predetermined period exceeds a predetermined amount.

8. The combination with a wattmeter device and a circuit-controlling device, of mechanical means for effecting operative engagement of said circuit-controlling device and said wattmeter device, and means for periodically controlling the action of said mechanical means.

9. The combination with a supply circuit, translating means, and a wattmeter device, of means dependent upon time and upon the amount of power traversing said wattmeter device for effecting reductions of power in said supply circuit.

10. The combination with a supply circuit, a translating device, and an integrating wattmeter, of a rotatively movable member adapted to be operatively associated with said wattmeter, a clock mechanism adapted to effect said association for successive predetermined intervals of time, and electrical means dependent upon the degree of movement of said member for effecting changes in said supply circuit when the power traversing said wattmeter during any interval exceeds a predetermined value.

11. The combination with an electric circuit, a translating device, and a wattmeter device, of a rotatively movable member adapted to be operatively associated with said wattmeter device, means for successively effecting said association for predetermined intervals of time, and means associated with said movable member for effecting reductions of power in said circuit when the power traversing said wattmeter during any interval exceeds a predetermined value.

12. The combination with a storage battery and means for causing the same to charge and discharge, of means embodying a wattmeter device for restricting the rate of discharge to a predetermined value.

13. The combination with a translating device, a generator and a battery connected in multiple, and adapted to supply energy thereto, of means embodying a wattmeter device and a switching device actuated thereby for gradually shifting the load upon said generator when the rate of discharge of said battery exceeds a predetermined amount.

14. The combination with an electric circuit, a generator supplying the same, and a battery associated with said circuit, of means embodying a wattmeter device and a switching device coöperating therewith for regulating the battery to prevent the energy delivered thereby to the electric circuit from exceeding a predetermined value within a predetermined time interval.

15. The combination with a receiving circuit, a generator and a battery supplying energy thereto, and a regulating device having coöperating energizing coils for maintaining a predetermined load upon said generator, of means embodying a wattmeter device and a switching device associated with said battery and dependent upon the rate of discharge thereof for automatically controlling the energization of the coils of said regulating device.

16. The combination with a storage battery and a translating device, of automatic means embodying a voltage regulating device, a switching device in circuit therewith and an actuating device therefor dependent upon time and upon the amount of energy delivered by said battery for preventing said battery from discharging in excess of a predetermined rate.

17. The combination with a receiving circuit, a generator and a battery adapted to supply energy thereto, and a regulating device for maintaining a constant load upon said generator and for causing said battery to charge and discharge, of a wattmeter mechanism connected in said battery circuit, and a rheostatic device adapted to be periodically associated therewith for automatically effecting changes in the operation of said regulating device when the energy discharged from said battery exceeds a predetermined amount in a given time interval.

18. The combination with an electric circuit, a storage battery, a booster associated therewith, and an exciter for said booster, of means for governing the direction and value of the electromotive force of said booster, said means comprising two coöperating contact-carrying members, one of which is provided with an actuating coil that is connected across the exciter terminals, and the other of which is provided with an actuating coil supplied with current which is proportional to that which traverses the electric circuit, and means for regulating the amount of resistance in circuit with the latter coil when the energy discharged by said battery exceeds a predetermined amount within a predetermined period.

In testimony whereof, I have hereunto subscribed my name this 31st day of May, 1911.

FRANK CONRAD.

Witnesses:
F. D. HALLOCK,
B. B. HINES.